UNITED STATES PATENT OFFICE 2,391,281

PLASTICIZING COPOLYMERS

Harry H. Thompson, Akron, Ohio, assignor to Wingfoot Corporation, Akron, Ohio, a corporation of Delaware No Drawing. Application June 3, 1943,
Serial No. 489,507

1 Claim. (Cl. 260—36)

This invention relates to plasticizing a copolymer of butadiene and styrene or butadiene and acrylonitrile. Such copolymers are well known in the art, being rubber substitutes used in the production of automobile tires, etc.

According to this invention, the raw copolymer is plasticized with a fatty acid—for example, acetic acid, butyric acid, citric acid, lauric acid or other aliphatic carboxylic acid, such as benzoic acid—or it is plasticized with a monohydric alcohol, such as methyl alcohol, ethyl alcohol, propyl alcohol, butyl alcohol, etc. Ordinarily, one will not use an alcohol or acid containing more than eight carbons in the chain, and the chain will usually be saturated.

The plasticizing operation is preferably carried out on a rubber mill. The raw copolymer, preferably at a somewhat elevated temperature, is worked on the mill until slightly warm. For example, it may be heated to a temperature of 100–150° F. The plasticizer is then added and blended into the copolymer. This is done by milling the two materials together for a number of minutes, for example, from about 8 to 15 minutes. The amount of plasticizer employed will depend upon the degree of plasticity desired. At least 1 per cent of plasticizer will be used. For example, from 2 to 6 per cent of acetic acid or more may be used up to 10 per cent or higher. If methyl alcohol is employed, from 2 to 8 per cent will generally be used.

The following example illustrates the invention:

Seventy-five pounds of ground, raw synthetic Buna S (a copolymer of butadiene and styrene) is placed on standard rubber mixing rolls. Three pounds of acetic acid are added after 1 minute of warming up to 125 to 150° F. The materials are then mixed on the mill for about 10 minutes. When removed from the mill, the material is ready for processing by standard rubber-working equipment. Instead of acetic acid, methyl alcohol may be used. In employing an alcohol, it is necessary to see that the temperature of the plastic does not become so high that the alcohol is vaporized.

Buna N (butadiene and acrylonitrile) may be substituted for Buna S in the above formula. It may be plasticized with either an alcohol or acid as here described.

This invention is in part a continuation of my application Serial No. 435,131, filed March 18, 1942.

What I claim is:

An uncured, rubber-like copolymer of butadiene and styrene which contains between about 2% and about 8% based on the weight of the copolymer of methyl alcohol as a plasticizer.

HARRY H. THOMPSON.